United States Patent
Gervais et al.

[11] Patent Number: 5,575,441
[45] Date of Patent: Nov. 19, 1996

[54] FUEL LIQUID/VAPOR VENT CONTAINMENT/RECOVERY SYSTEM

[75] Inventors: James R. Gervais, Swansea; Walter S. Lambert, St. Lakeville, both of Mass.

[73] Assignee: The United States of America as represented by the Secretary of the Air Force, Washington, D.C.

[21] Appl. No.: 345,182

[22] Filed: Nov. 28, 1994

[51] Int. Cl.⁶ .................................................. B64D 15/00
[52] U.S. Cl. ........................ 244/135 R; 141/87; 141/331; 141/86
[58] Field of Search ........................ 244/135 R; 285/177, 285/176; 141/115, 52, 198, 86, 87, 88, 331, 340

[56] References Cited

U.S. PATENT DOCUMENTS

| | | | |
|---|---|---|---|
| 541,647 | 6/1895 | Welsh | 285/177 |
| 3,944,261 | 3/1976 | Reed et al. | 285/177 |
| 4,032,091 | 6/1977 | Reddy | 244/135 R |
| 4,328,844 | 5/1982 | Becktel et al. | 141/302 |
| 4,844,133 | 7/1989 | von Meyerinck et al. | 141/387 |
| 4,981,272 | 1/1991 | Cutore | 244/135 A |
| 5,072,912 | 12/1991 | LeBlanc et al. | 251/63.5 |
| 5,230,372 | 7/1993 | Westphal | 141/86 |
| 5,456,295 | 10/1995 | Taylor et al. | 141/198 |

Primary Examiner—Andres Kashnikow
Assistant Examiner—Tien Dinh
Attorney, Agent, or Firm—Stanton E. Collier

[57] ABSTRACT

The present invention provides a device for preventing the venting of fuel vapor to the atmosphere and liquid fuel spillage on military aircraft having vent/dump outlets thereon. On the F-15 fighter aircraft, for example, a dump mast is located on the trailing edge of a wing. The dump mast, externally, consists of a oblong walled outlet which is slanted consistent with the trailing edge. An adaptor is placed over the walled outlet and may be held in place by straps or clips. The adaptor has a reducer further attached thereon for the purpose of connecting to a standard hose. The hose therefrom may be returned to the fuel truck for collection of vapor or dumped fuel.

5 Claims, 3 Drawing Sheets

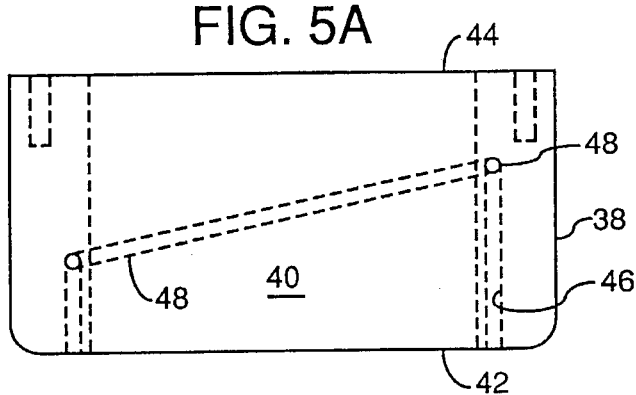
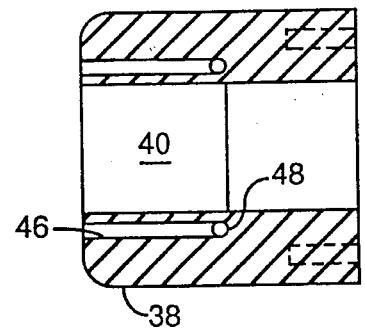
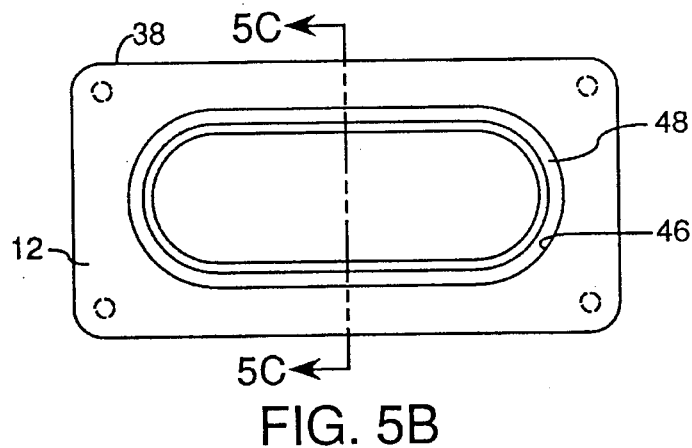
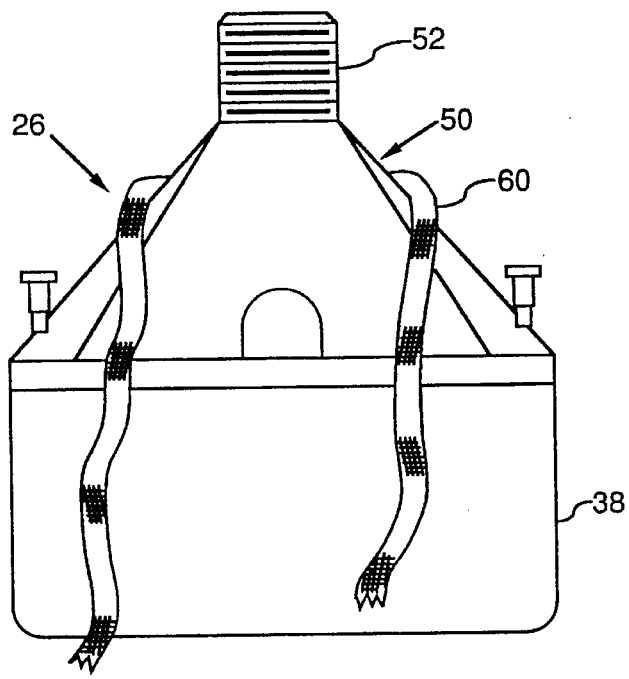

5,575,441

FUEL LIQUID/VAPOR VENT CONTAINMENT/RECOVERY SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to refueling of aircraft having thereon vent dumps, and, particularly, relates to means connected to the vent dumps to prevent fuel spills and recovery of any excess liquid fuel and vapors release during refueling.

Many existing aircraft, especially, fighter aircraft, have wing vent/dump outlets thereon, typically two per aircraft. A pressure relief valve placed between the vent/dump outlet and the fuel tank if actuated allows vapor and/or fuel to be release from the aircraft. There is presently no means for controlling the release and releases are a present concern because of the safety hazard and damage to the environment. The need for rapid turn-around of fighter aircraft is weighted against these concerns. The attachment of complex handling systems or extensive modifications of present aircraft are negative factors in addressing these concerns.

U.S. Pat. No. 4,328,844 discloses a pressure fueling adaptor able to input fuel and defuel in separate modes. The problem of venting and dumping are not addressed therein.

U.S. Pat. No. 4,844,133 discloses a means for fueling military type aircraft which have high wings.

U.S. Pat. No. 4,981,272 discloses a typical type of refueling tanker.

U.S. Pat. No. 5,072,912 discloses a means of connecting headspace of a tank to be filled with the headspace of a tanker truck.

Thus, there exists a need for a means of preventing vapor venting and fuel dumping from an aircraft having a vent/dump outlet.

SUMMARY OF THE INVENTION

The present invention provides a means for preventing the venting of fuel vapor to the atmosphere and liquid fuel spillage of military aircraft having vent/dump outlets thereon.

On the F-15 fighter aircraft, for example, a dump mast is located on the trailing edge of both wings, near the outer end. The dump, mast, externally, consists of a oblong walled outlet which is slanted consistent with the trailing edge. An adaptor is placed over the walled outlet and may be held in place by straps or clips. The adaptor has a reducer further attached thereon for the purpose of connecting to a standard hose. The hose therefrom may be returned to the fuel truck for collection of vapor or dumped fuel.

Therefore, one object of the present invention is to provide a fuel liquid/vapor vent containment/recovery system for use of aircraft with vent/dump outlets.

Another object of the present invention is to provide a means for preventing vapor ventings and fuel dumping which is quickly connected to the aircraft.

Another object of the present invention is to provide a means for preventing vapor ventings and fuel dumping which is easily adaptable to present aircraft wing vent/dump outlets.

Another object of the present invention is to provide a means for meeting environmental concerns as to aircraft refueling.

Another object of the present invention is to provide a means for increased safety near aircraft being fueled.

Another object of the present invention is to provide a means for insuring a more healthier work environment for persons involved in fueling aircraft.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 5A is a top view of an connector of the present invention for connection to the wing dump mast outlet.

FIG. 5B is a front view of the connector of FIG. 5A.

FIG. 5C is a cross section of the connector of FIG. 5B.

FIG. 6 is a top view of a reducer for connection to the connector of FIG. 5A.

DETAILED DESCRIPTION OF THE PREFERRED EMBODIMENT

Figure 1:
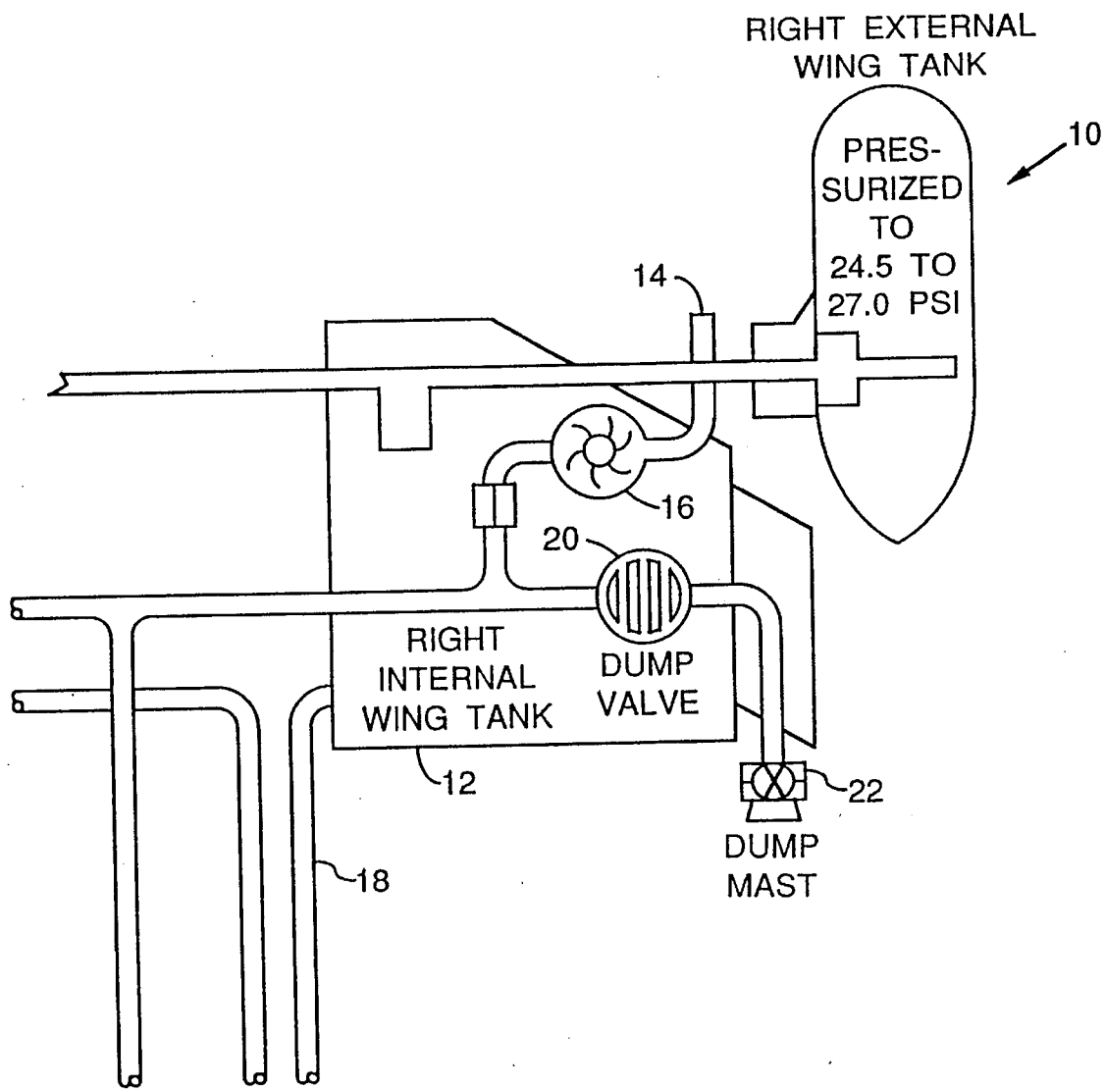
FIG. 1 illustrates by partial block diagram a fuel system for an aircraft such as an F-15.
Figure 2:
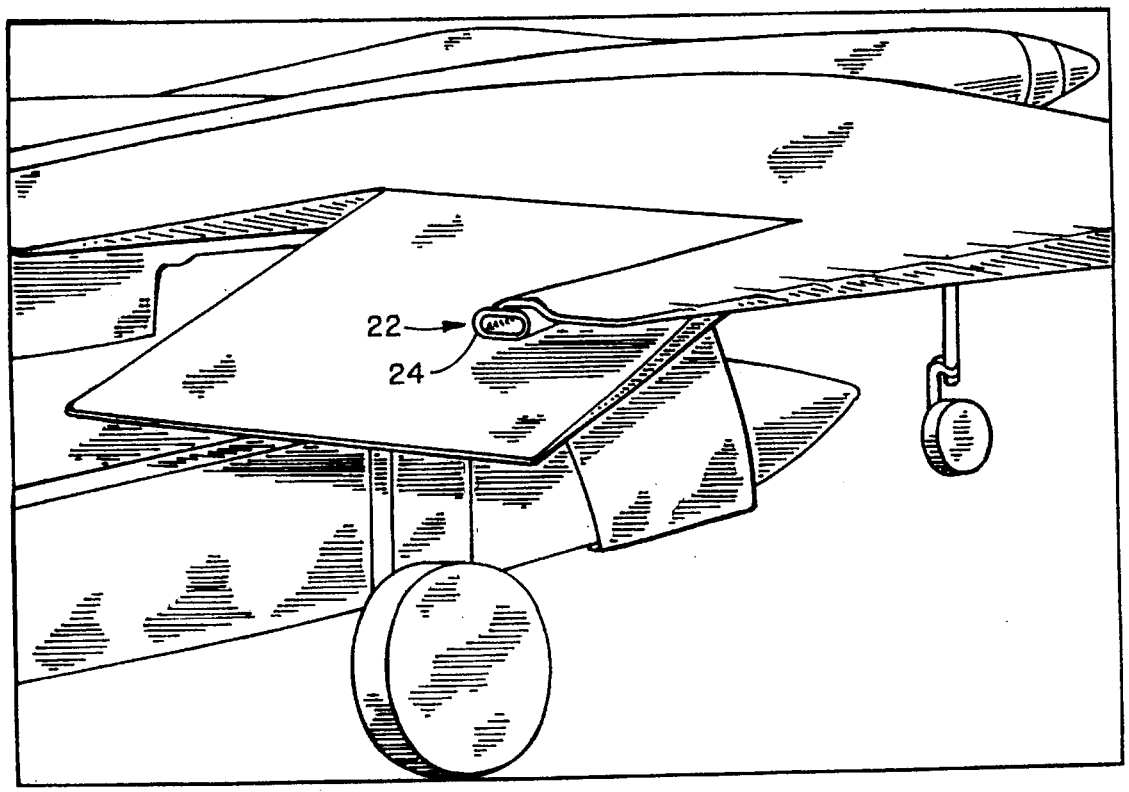
FIG. 2 is an illustration of the wing dump mast on the present existing F-15s, some aircraft having only one.

Referring to FIG. 1, a partial block diagram of a fuel system 10 for an aircraft such as an F-15 is shown. An internal wing tank 12 is fueled by an external fuel hose, not shown, attached to an inlet 14. The input fuel is fed into the tank 12 by means of a transfer pump 16 which supplies fuel to other tanks. A gravity fuel line 18 is also attached to the wing tank 12. If the tank 12 becomes overfilled or overpressurized a dump valve 20 opens which allows fuel, either vapor or liquid, to flow to a dump mast 22 being located on a trailing edge of a wing as shown in FIG. 2. A vent dump outlet 24 is further shown in FIGS. 4A and 4B. As seen therein, outlet 24 is rectangularly shaped, has a wall 27 of uniform thickness which rests upon a base 29. The discharged fuel leaves from an interior channel 30 within the walls 27.

Figure 3:
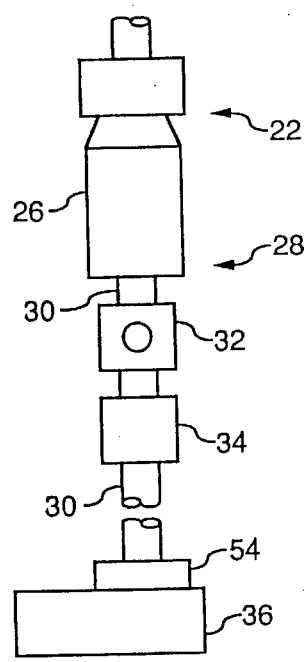
FIG. 3 is a block diagram of the present invention connected to the wing dump mast and to a fuel recovery system.

In order to prevent the vapor and/or liquid fuel from exiting to the environment, a vapor/liquid fuel system 28 is attached to the outlet 24, FIG. 3. An adaptor assembly 26 connects to the dump mast 22 which has the outlet 24 thereon. A fuel hose 30 is attached to the adaptor assembly 26. In order to determine if any liquid is flowing therethrough, a sight glass apparatus 32 is attached therein. An additional alarm such as a blinker type indicator 34 would indicate any fuel flow or any other problems in the fuel line 30 such as kinking which would cause an overpressure in the aircraft tanks and cause possible rupture. For example, a one way air valve could be placed near the adaptor assembly 26 or even on the adaptor assembly 26. A suction would be applied to the hose 30 at a fuel container 36. As long as there is a free flow of input air from the air valve, there would be no kinking in the hose 30. Conventional sensors for measuring the flow of air and/or vapor and/or fuel are clearly adaptable to this invention. The vented vapor or fuel would be returned to the fuel container 36. A source of suction 54 at the fuel container 36 would assist in the removal of the vented vapor or dumped fuel. If a problem occurs in the hose 30, an alarm would sound or an automatic shutoff of the fuel pump would occur.

Figure 4A:
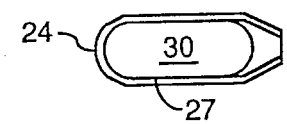
FIG. 4A is a front view of the present existing wing dump mast.
Figure 4B:
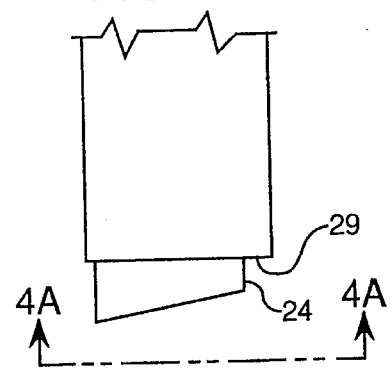
FIG. 4B is a top view of the wing dump mast.

Referring to FIGS. 5A, 5B, and 5C, a connector 38 is shown in different views. As seen in FIG. 5A, an interior channel 40 passes from a front 42 to a back 44. A deep groove 46 is placed into the front 42 so as to receive the wall 26 of the vent/dump outlet 24 as seen in FIG. 4A. At the bottom of the groove 46 is located an O-ring 48 upon which the top of the wall 26 rests in order to prevent leaks of either vapor or fluid. As seen in FIG. 5A, the bottom of the groove 46 slants. A reducer 50, FIG. 6, is attached onto the connector 38 back 44 by means of bolting. This reducer 50 allows easy connection to a standard 1 inch hose at a threaded male fitting 52. Although, the connector 38 and reducer 50 are shown as separate components of the adaptor assembly 26, an integral unit is clearly possible. Having the reducer 50 as a separate component allows for different fittings and ease of manufacture.

A flexible cord 60, such as a bungee cord, FIG. 6, would attach about the adaptor assembly 26 and wrap about the wing to force the connector 38 onto the outlet 24. Other means are available for attachment such as placing D clips on the connector 38 which would connect to a modified outlet 24, but this requires modification to existing outlets. Other means are clearly available to hold the adaptor assembly 26 to the outlet 24.

A single hose for fueling and vent/dump is possible but would require the modification of existing connectors where the fuel is input. Further the adaptor assembly would be more complex because of the two way flow.

Clearly many modifications and variations of the present invention are possible in light of the above teachings and it is therefore understood, that within the inventive scope of the inventive concept, the invention may be practiced otherwise than specifically claimed.

What is claimed is:

1. An adaptor assembly for connecting a hose to a wing vent/dump outlet, said adaptor being a part of a fuel liquid/vent containment/recovery system of an aircraft having said vent/dump outlet, said vent/dump outlet being positioned on a wing and having an aerodynamic shape thereto, said vent/dump outlet having an opening enclosed by a wall having its top cut at a slant to a base with said wall mounted thereon said adaptor assembly comprising:

a connector, said connector having an interior channel therethrough for the flow of vent and/or dumped fuel and/or vapor of said fuel, said connector having a groove in a front thereof, said groove being about said interior channel, said groove having a shape to receive said wall of said outlet, said groove having a bottom shaped in a slanting manner to complement the slant of said wall, said front further having a shape to conform to a base of said outlet, said groove having a single O-ring at the bottom thereof for sealing engagement with the top of said wall having a slant thereto;

a reducer, said reducer being connected to a back of said connector, said reducer having an interior channel therethrough, a first opening of said reducer being congruent with an opening of said interior channel of said connector, said reducer having a means for connecting a hose to said reducer; and a means for holding said connector and said reducer to said outlet for a sealed engagement with said outlet upon refueling of said aircraft.

2. An adaptor assembly as defined in claim 1 wherein said connector and said reducer are an integral unit.

3. An adaptor assembly as defined in claim I further including a means for detecting the flow of either vapor or liquid therein, said means connected into said hose connected to said adaptor assembly.

4. An adaptor assembly as defined in claim 1 wherein said means for connecting to said reducer is a quick disconnect fitting.

5. An adaptor assembly as defined in claim 1 wherein said holding means comprises a flexible cord placed about said adaptor assembly and a wing of said aircraft.

\* \* \* \* \*